United States Patent
Kennedy

(10) Patent No.: US 8,553,146 B2
(45) Date of Patent: Oct. 8, 2013

(54) VISUALLY IMPERCEPTIBLE MATRIX CODES UTILIZING INTERLACING

(75) Inventor: John T. Kennedy, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 403 days.

(21) Appl. No.: 13/014,591

(22) Filed: Jan. 26, 2011

(65) Prior Publication Data
US 2012/0188442 A1   Jul. 26, 2012

(51) Int. Cl.
*H04N 3/14* (2006.01)
*H04N 5/66* (2006.01)
*G06K 7/10* (2006.01)

(52) U.S. Cl.
USPC ........... 348/465; 348/461; 348/473; 348/460; 235/462.05; 235/462.07

(58) Field of Classification Search
USPC ............ 348/461, 460, 465, 473; 235/462.01, 235/460, 462.02, 462.05, 462.07, 462.14
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,978,855 A | 11/1999 | Metz et al. | |
| 6,006,990 A * | 12/1999 | Ye et al. | 235/454 |
| 6,058,238 A | 5/2000 | Ng | |
| 6,370,272 B1 * | 4/2002 | Shimizu | 382/232 |
| 6,512,919 B2 | 1/2003 | Ogasawara | |
| 6,556,273 B1 | 4/2003 | Wheeler et al. | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

Byford, D., "Universal Interactive Device," International Business Machines Corporation, Jun. 1998, 1 page.

(Continued)

*Primary Examiner* — Jefferey Harold
*Assistant Examiner* — Jean W Desir
(74) *Attorney, Agent, or Firm* — Kilpatrick Townsend & Stockton LLP

(57) ABSTRACT

A device obtains a video and a matrix code (such as a QR code) to divide into portions and interlace with the video. The device generates a modified interlaced video by including at least a first portion in a first but not a second field of a first frame, a second portion in a second but not a first field of a second frame, and so on such that all of the portions of the matrix code are included in the modified interlaced video. Subsequently, the device transmits the modified interlaced video to a display. When the modified interlaced video is displayed, the matrix code is present but not visually perceptible. A matrix code reader detects and/or records and analyzes the displayed modified video to identify the portions of the matrix code included therein, extract such portions, and combine the extracted portions to form the matrix code.

21 Claims, 9 Drawing Sheets

(56) References Cited

U.S. PATENT DOCUMENTS

| | | |
|---|---|---|
| 6,983,304 B2 | 1/2006 | Sato |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,386,339 B2 | 2/2013 | Minnick et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1* | 3/2007 | Attia et al. ............... 235/462.46 |
| 2007/0073585 A1 | 3/2007 | Apple et al. |
| 2007/0143788 A1 | 6/2007 | Abernethy et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0088213 A1 | 4/2009 | Rofougaran |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0039573 A1 | 2/2011 | Hardie |
| 2011/0065451 A1 | 3/2011 | Danado et al. |
| 2011/0107386 A1 | 5/2011 | De Los Reyes et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1* | 6/2012 | Gomez et al. ................. 235/375 |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |

| 2012/0182320 | A1 | 7/2012 | Beals et al. |
| 2012/0188112 | A1 | 7/2012 | Beals et al. |
| 2012/0198572 | A1 | 8/2012 | Beals et al. |
| 2012/0199643 | A1 | 8/2012 | Minnick et al. |
| 2012/0206648 | A1 | 8/2012 | Casagrande et al. |
| 2012/0215830 | A1 | 8/2012 | Anguiano |
| 2012/0217292 | A1 | 8/2012 | Gratton et al. |
| 2012/0217293 | A1 | 8/2012 | Martch et al. |
| 2012/0218470 | A1 | 8/2012 | Schaefer |
| 2012/0218471 | A1 | 8/2012 | Gratton |
| 2012/0222055 | A1 | 8/2012 | Schaefer et al. |
| 2012/0222071 | A1 | 8/2012 | Gaede et al. |
| 2012/0222081 | A1 | 8/2012 | Schaefer et al. |

FOREIGN PATENT DOCUMENTS

| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 139 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office Action mailed Dec. 19, 2012, 29 pages.
U.S. Appl. No. 13/020,678, filed Feb. 3, 2011, Notice of Allowance mailed Jan. 30, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011, Notice of Allowance mailed Jan. 18, 2013, 27 pages.
U.S. Appl. No. . 13/673,480, filed Nov. 9, 2012 Office Action mailed Jan. 16, 2013, 27 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.

Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.

U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.

"Android App Reviews & Showcase Just a Tapp Away," Android Tapp, 10 pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WiFi for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busin, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retreived from Internet: http://citeseerx.ist.psu.edu/viewdoc/download?doi=10.1.1.148.6904&rep1&type=pdf.

U.S. Appl. No. 12/953,227, filed Nov. 23, 2010, Michael T. Dugan et al.

U.S. Appl. No. 12/953,273, filed Nov. 23, 2010, Dan J. Minnick et al.

U.S. Appl. No. 12/958,073, filed Dec. 1, 2010, William Michael Beals et al.

U.S. Appl. No. 12/960,285, filed Dec. 3, 2010, Jason Gaede, et al.

U.S. Appl. No. 12/961,369, filed Dec. 6, 2010, Mark H. Gomez.

U.S. Appl. No. 12/964,478, filed Dec. 9, 2010, William Michael Beals.

U.S. Appl. No. 12/965,645, filed Dec. 10, 2010, Kranti Kilaru et al.

U.S. Appl. No. 12/971,349, filed Dec. 17, 2010, Mark H. Gomez et al.

U.S. Appl. No. 12/973,431, filed Dec. 20, 2010, Keith Gerhards et al.

U.S. Appl. No. 12/981,244, filed Dec. 29, 2010, Steven M. Casagrande et al.

U.S. Appl. No. 12/984,385, filed Jan. 4, 2011, Max S. Gratton.

U.S. Appl. No. 12/986,721, filed Jan. 7, 2011, Mark H. Gomez et al.

U.S. Appl. No. 13/006,270, filed Jan. 13, 2011, William Michael Beals et al.

U.S. Appl. No. 13/007,317, filed Jan. 14, 2011, Max S. Gratton et al.

U.S. Appl. No. 13/010,557, filed Jan. 20, 2011, William Michael Beals et al.

U.S. Appl. No. 13/015,382, filed Jan. 27, 2011, William Michael Beals et al.

U.S. Appl. No. 13/016,483, filed Jan. 28, 2011, Mark H. Gomez et al.

U.S. Appl. No. 13/020,678, filed Feb. 3, 2011, Dan J. Minnick et al.

U.S. Appl. No. 13/028,030, filed Feb. 15, 2011, Steven M. Casagrande et al.

U.S. Appl. No. 13/031,115, filed Feb. 18, 2011, Jason Anguiano.

U.S. Appl. No. 13/035,525, filed Feb. 25, 2011, Germar Schaefer et al.

U.S. Appl. No. 13/037,302, filed Feb. 28, 2011, Germar Schaefer et al.

U.S. Appl. No. 13/034,474, filed Feb. 25, 2011, Max S. Gratton.

U.S. Appl. No. 13/034,482, filed Feb. 24, 2011, Germar Schaefer.

U.S. Appl. No. 13/037,312, filed Feb. 28, 2011, Max S. Gratton et al.

U.S. Appl. No. 13/037,316, filed Feb. 28, 2011, Henry Gregg Martch et al.

U.S. Appl. No. 13/037,333, filed Feb. 28, 2011, Jason Gaede et al.

Extended European Search Report for EP 12152690.9 dated Jun. 19, 2012, 9 pages.

International Search Report and Written Opinion of PCT/US2012/026624 mailed Aug. 29, 2012, 14 pages.

U.S. Appl. No. 12/958,073, filed Dec. 1, 2010, Office Action mailed Aug. 31, 2012, 12 pages.

U.S. Appl. No. 12/961,369, filed Dec. 6, 2010, Final Rejection mailed Oct. 30, 2012, 17 pages.

U.S. Appl. No. 12/971,349, filed Dec. 7, 2010 ), Final Rejection mailed Oct. 24, 2012, 11 pages.

U.S. Appl. No. 12/953,227, filed Nov. 23, 2010, Office Action mailed Nov. 7, 2012, 31 pages.

U.S. Appl. No. 13/015,382, filed Jan. 27, 2011, Office Action Mailed Nov. 13, 2012, 7 pages.

U.S. Appl. No. 13/016,483, filed Jan. 28, 2011 Office Action mailed Nov. 2, 2012. 18 pages.

U.S. Appl. No. 12/953,273, filed Nov. 23. 2010, Notice of Allowance, mailed Oct. 18, 2012, 11 pages.

U.S. Appl. No. 13/034,482, filed Feb. 24, 2011, Office Action mailed Oct. 19, 2012, 11 pages.

U.S. Appl. No. 13/035,474, filed Feb. 25, 2011, Office Action mailed Oct. 30, 2012, 11 pages.

U.S. Appl. 12/960,285, filed Dec. 3, 2010, Final Office Action mailed Dec. 6, 2012, 17 pages.

U.S. Appl. No. 12/984,385, filed Jan. 4, 2011, Notice of Allowance mailed Nov. 28, 2012, 11 pages.

U.S. Appl. No. 13/037,312, filed Feb. 28, 2011, Office Action mailed Aug. 15, 2012, 9 pages.

* cited by examiner

VISUALLY IMPERCEPTIBLE MATRIX CODES UTILIZING INTERLACING

FIELD OF THE INVENTION

This disclosure relates generally to displaying matrix codes, and more specifically to utilizing interlacing to present matrix codes that are visually imperceptible.

SUMMARY

The present disclosure discloses systems and methods for conveying, presenting, and/or obtaining matrix codes that are visually imperceptible to a user. An electronic device may obtain an interlaced video segment to transmit to a display device and one or more matrix codes (such as QR codes) to divide into portions and interlace with the interlaced video segment. The electronic device may generate a modified interlaced video segment by including at least a first portion in a first field but not a second field of a first frame, a second portion in a second field of a second frame but not a first field of the second frame, and so on such that all of the portions of the matrix code are included in at least a portion of the modified interlaced video segment.

Subsequently, the electronic device may transmit the modified interlaced video segment to one or more display devices (whether directly, via one or more other electronic devices, and so on) for display. As such, when the display device displays the modified interlaced video segment, the matrix code may be present but not visually perceptible to a human viewer.

A matrix code reader device may detect and/or record at least part of the modified video segment displayed by the display device and analyze at least a portion of the modified video segment to attempt to obtain the matrix code. In attempting to obtain the matrix code from the portion of the modified video segment, the matrix code reader device may identify the portions of the matrix code included therein, extract such portions, and combine the extracted portions to form the matrix code.

If the matrix code is not successfully obtained, the matrix code reader may reattempt to obtain the matrix code from the portion of the modified video segment, attempt to obtain the matrix code from another detected and/or recorded portion of the modified video segment, detect and/or record another portion of the modified video segment and attempt to obtain the matrix code from such portion, and so on. However, if the matrix code reader device successfully obtains the matrix code, the matrix code reader may decode the matrix code and may perform one or more actions based on the decoded matrix code.

As part of interlacing the matrix code portions with the interlaced video segment, the electronic device may add one or more indicators to the interlaced video segment to indicate the presence of the matrix code and/or information about the matrix code that is present (such as reference points related to the matrix code, boundaries of the matrix code, functions related to the matrix code, and so on). For example, the processing unit may add one or more banners, colored dots, guide marks, text messages, and so on which may be visually recognized by a user. By way of a another example, the electronic device may add portions of the matrix code to the interlaced video segment in such a way that the portions of the matrix code have a different display property than the video data of the interlaced video segment such that they can be more easily identified and extracted by the matrix code reader device.

In some implementations, the electronic device may divide the matrix code and add the matrix code to the interlaced video segment according to a predefined matrix code interlacing pattern. Such an interlacing pattern may specify a specific sequence of exactly which portions of the matrix code are added to which particular fields of which particular frames in which particular positions in reference to a selected initial frame. Additionally, a synchword may be added to an initial frame to identify the start of a sequence to the matrix code reader device. The matrix code reader device may then use the interlacing pattern to identify exactly where particular portions of a matrix code are located in the particular fields of particular frames of a modified interlaced video segment in time and/or position with reference to the initial frame indicated by the identified synchword.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
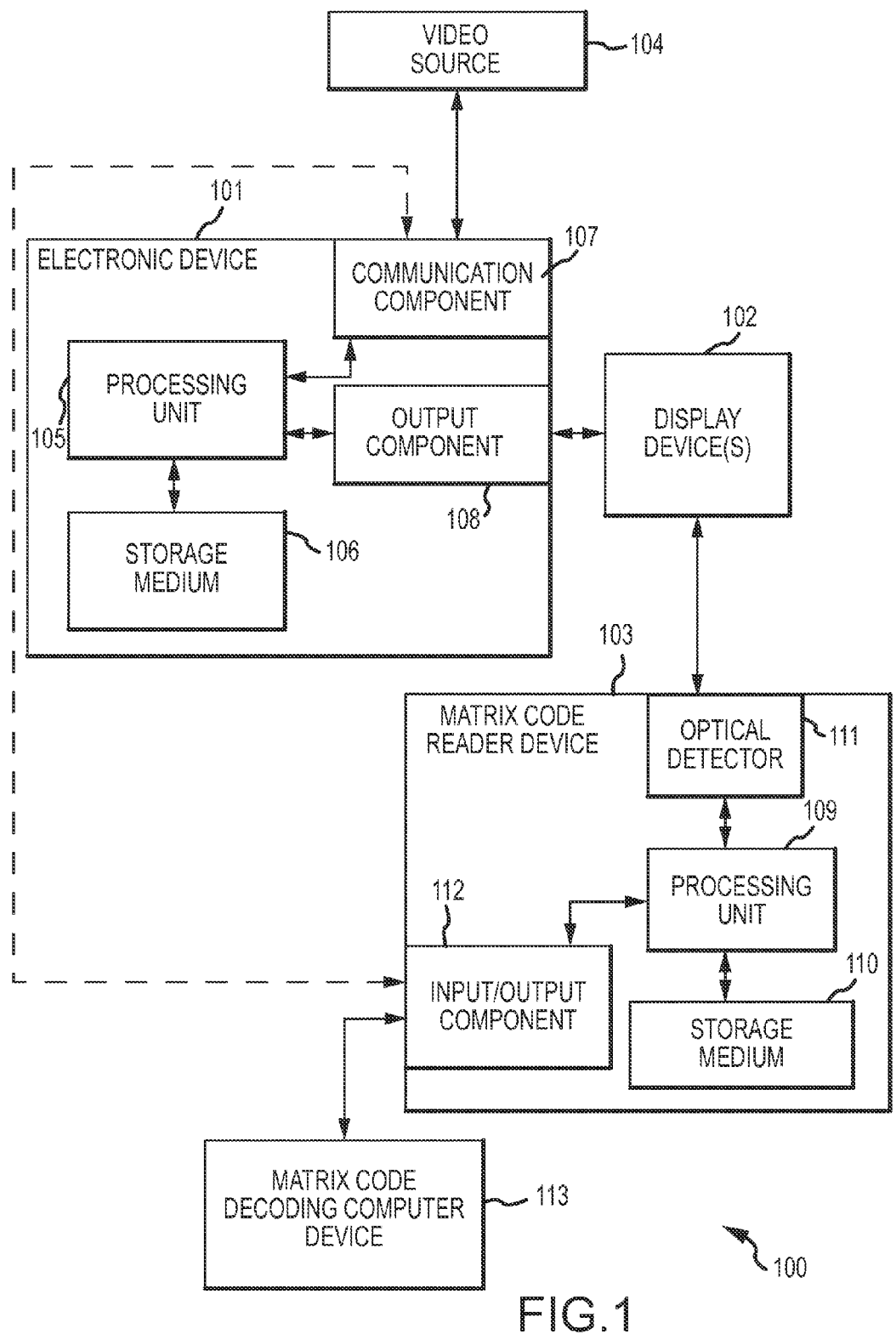
FIG. 1 is a block diagram illustrating a system for conveying matrix codes.

The description that follows includes sample systems, methods, and computer program products that embody various elements of the present disclosure. However, it should be understood that the described disclosure may be practiced in a variety of forms in addition to those described herein.

Electronic devices (such as set top boxes, television receivers, digital video recorders, digital video disc players, televisions, desktop computers, electronic kitchen appliances, and so on) may display matrix codes, such as QR codes, for a variety of purposes. These purposes may include, but are not limited to, connecting users to information, providing content that is related to an aspect of the electronic device, facilitating ordering of products or services, assisting users in operating the electronic device, and so on. To make use of matrix codes displayed by an electronic device, a user may capture the matrix code utilizing a matrix code reader device. For example, a user may take a picture of the matrix code using a camera on a cellular telephone. The cellular telephone may include an application that decodes information from the captured matrix code and performs one or more actions based on that information (such as displaying the decoded information, connecting to a web site, transmitting the decoded information to another device, and so on), an application that transmits the captured matrix code to another device for decoding and performing actions, and so on.

However, display of matrix codes may require a portion, if not all, of available display space on a display device. Thus, if a matrix code is displayed, the respective portion of display space may not be usable for displaying other information, such as content displayed by the electronic device on the display device. For example, if a matrix code is displayed on a display device that is displaying video content, the display space occupied by the matrix code may not be used to display the respective portion of the video content. Essentially, the matrix code blocks a user's view of the video content. As such, the length of time that a matrix code can be displayed is limited as the user is unable to fully view the video content during that time. However, if the matrix code is not displayed for a long enough period of time, the user may be unable to capture the matrix code if they so desire.

Interlace is a technique utilized to improve the picture quality of video segment without consuming extra bandwidth. Instead of transmitting an entire frame of video data to a display device at a time, multiple fields that each contain a portion of the information for a frame are sent sequentially to the display device. For example, a Phase Alternate Line (PAL) based television utilizes two fields of twenty-five lines each to create a frame. For each frame, one field transmitted to the PAL based television contains information (i.e., picture elements to update) regarding the odd lines to display for a frame and the other field contains the information regarding the even lines. The PAL based television scans fifty fields per second (or twenty-five frames that each include two fields) every second, resulting in a display of twenty-five frames per second. Due to the effect of persistence of vision (as well as afterglow of picture elements and so on), the individual fields and frames are perceived as a unified video segment.

The present disclosure discloses systems and methods for conveying, presenting, and/or obtaining matrix codes that are visually imperceptible to a user. An electronic device may obtain an interlaced video segment to transmit to a display device. The interlaced video segment may be received from a content provider, retrieved from a storage medium, and so on. Further, the video segment may not be interlaced when the electronic device obtains the video segment. As such, the electronic device may divide each of the frames of the video segment into two or more fields. The electronic device may also obtain one or more matrix codes (such as QR codes) to divide into portions and interlace with the interlaced video segment. The electronic device may receive the matrix code to interlace with the interlace video segment, retrieve the matrix code from a storage medium, and so on. Then, the electronic device may generate a modified interlaced video segment by including at least a first portion in a first field but not a second field of a first frame, a second portion in a second field of a second frame but not a first field of the second frame, and so on such that all of the portions of the matrix code are included in at least a portion of the modified interlaced video segment. Subsequently, the electronic device may transmit the modified interlaced video segment to one or more display devices for display. As such, when the display device displays the modified interlaced video segment, the matrix code may be present but not visually perceptible to a human viewer.

A matrix code reader device (such as a smart phone, mobile computer, and so on) may utilize one or more cameras (such as video cameras, still image cameras, and so on) to detect and/or record at least part of the modified video segment displayed by the display device. The matrix code reader device may then analyze at least a portion of the modified video segment to attempt to obtain the matrix code. In attempting to obtain the matrix code from the portion of the modified video segment, the matrix code reader device may identify the portions of the matrix code included therein, extract such portions, and combine the extracted portions to form the matrix code. If the matrix code reader device is unsuccessful in obtaining the matrix code, the matrix code reader may reattempt to obtain the matrix code from the portion of the modified video segment, attempt to obtain the matrix code from another detected and/or recorded portion of the modified video segment, detect and/or record another portion of the modified video segment and attempt to obtain the matrix code from such portion, and so on. However, if the matrix code reader device successfully obtains the matrix code, the matrix code reader may decode the matrix code (or transmit the matrix code to another computing device that decodes matrix codes for the matrix code reader) and may perform one or more actions based on the decoded matrix code (such as reporting capture of the matrix code, accessing a website specified by the matrix code). Hence; the user may be able to capture and utilize the matrix code from the display device without disruption of his viewing of the video segment as the matrix code may be visually imperceptible.

FIG. 1 is a block diagram illustrating a system 100 for conveying matrix codes. The system 100 includes a electronic device 101 which may be any electronic device that is operable to transmit video segments to a display device such as a set top box, a television receiver, a digital video recorder, a digital video disc player, a television, a computing device, a content provider head end (such as a television programming provider, a video on demand provider, and so on), and so on. The system may also include one or more display devices 102 and one or more matrix code readers 103. The display device may be any kind of display device such as a television, a computer monitor, a cathode-ray tube display, a liquid crystal display, a plasma display, and so on. The matrix code reader may be any kind of matrix code reader such as a cellular telephone, a smart phone, a tablet computing device, a laptop computing device, a personal digital assistant, a barcode reader, a mobile computing device, and so on.

The electronic device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), one or more communication components 107, and one or more output components 108. The processing unit may execute instructions stored in the non-transitory storage medium to obtain one or more video segments and transmit the video segments to the display device 102 via the output component. In some instances, the video segments may be obtained by retrieving the video segments from the non-transitory storage medium. In other instances, the video segments may be obtained by receiving the video segments from a video source 104 (which may be a television programming provider, a video on demand programming provider, a provider which supplies video content to the head end of a programming provider for further distribution, and so on) via the communication component. In some instances, the video segments obtained by the electronic device may be interlaced. However, in other instances the video segments may not be interlaced when obtained by the electronic device and the processing unit may execute instructions stored in the non-transitory storage medium to interlace the video segments.

The processing unit 105 may execute instructions stored in the non-transitory storage medium 106 to interlace one or more matrix codes (such as QR codes) with the video segments prior to transmission to the display device 102. The processing unit may interlace matrix codes with the interlaced video segments and then transmit them to the display device, store the modified video segments in the non-transitory storage medium for later transmission to the display device, and so on. The processing unit may divide the matrix code into portions (which may be any number of portions such as four portions, fifty portions, six hundred portions, and so on) and generate a modified interlaced video segment by combining portions of the matrix code with individual fields of the interlaced video segment.

In addition to interlacing the one or more matrix codes with the video segments, in some implementations the processing unit 105 may be configured to also generate the one or more matrix codes. In such implementations, the processing unit 105 may generate the one or more matrix codes based on information such as metadata provided with and/or in association with the video segments.

Some frames of the interlaced video segment may have one or more portions of the matrix code added to a first field and not a second field while other frames may have one or more portions of the matrix code added to a second field and not a first field. In this way, the potential visual perceptibility of the matrix code in the modified interlaced video signal when displayed may be reduced. Further, matrix code portions added to sequential frames may alternate between adding matrix code portions to a first field in a first of the sequential frames but not a second field and to a second field in a second of the sequential frames but not a first field. In this way, the potential visual perceptibility of the matrix code in the modified interlaced video signal when displayed may be even further reduced. It should be understood that matrix code portions may not be added to a field of every frame in an interlaced video segment. For example, one or more matrix code portions may be added to a first field but not a second field of a first frame and to a second field but not a first field of a second frame where the second frame is several frames subsequent to the first frame and the intervening frames do not have any matrix code portions added.

Additionally, the processing unit may add portions of the matrix code and/or the entire matrix code to the interlaced video signal more than once. In some instances, the processing unit may add one or more particular portions of the matrix code to the interlaced video signal multiple times for purposes of redundancy in case a portion is not captured one of the times that it appears. In some implementations, the processing unit may add portions of the matrix code to the interlaced video signal such that the all of the portions of the matrix code are present multiple times throughout the modified interlaced video segment, in some cases such that a sequence of portions of the matrix code repeat throughout the entire modified interlaced video segment.

The matrix code reader device 103 may include one or more processing units 109, one or more non-transitory storage media 110, one or more communication components, one or more optical detectors 111 (such as still image cameras, video cameras, and so on), and one or more input/output components 112 (such as one or more displays, keyboards, mice, buttons, virtual keyboards, network adapters, cellular transmitters/receivers, and so on). The processing unit may execute instructions stored in the non-transitory storage medium to utilize the optical detector to detect all or part of the modified video segment displayed by the display device 102 and/or store all or part of the modified video segment in the non-transitory storage medium.

The processing unit 109 may also execute instructions stored in the non-transitory storage medium 110 to identify portions of the matrix code in the detected and/or stored portions of the modified video segment, extract the portions of the matrix code, and combine the portions to form the matrix code. The processing unit 109 may determine whether the extracted portions of the matrix code are complete. If the extracted portions are not complete, the processing unit may reanalyze the portion of the modified video segment; analyze a different portion of the modified video segment; detect and/or store an additional portion of the modified video segment and analyze the additional portion; send a communications signal to the electronic device 101 (such as via a Bluetooth™ connection, WiFi connection, and/or other wired and/or wireless communication connection between the input/output component 112 and the communication component 107) requesting retransmission of the matrix code (or portions thereof that were not received), instructing not to transmit one or more matrix codes, and/or repeat one or more intervals for the matrix code; and/or perform other processing operating which facilitate the capture and use of one or more matrix codes. If the extracted portions are complete, the processing unit may combine the portions to form the matrix code and may decode the formed matrix code and perform one or more actions based thereon, transmit the formed matrix code to a matrix code decoding computer device 113 via the input/output component 112, and/or perform other processing operating which facilitate the capture and use of one or more matrix codes. Actions that the processing unit may perform based on the formed matrix code may include, but are not limited to, presenting a confirmation that a matrix code was captured, and/or accessing a web site specified by information decoded from the formed matrix code. If the formed matrix code is transmitted to the matrix code decoding computer device, the matrix code computer device may decode the received matrix code and perform one or more actions based thereon, including but not limited to those described herein.

As part of interlacing the matrix code portions with the interlaced video segment, the processing unit 105 may add one or more indicators to the interlaced video segment to indicate the presence of the matrix code and/or information about the matrix code that is present (including, but not limited to, reference points related to the matrix code, boundaries of the matrix code, and/or functions related to the matrix code). For example, the processing unit may add one or more banners, colored dots, guide marks, text messages, and other such indicators that are visually perceptible in the modified interlaced video segment when displayed on the display device 102 in order to alert a user that a matrix code is present for potential capture even if the user cannot see the matrix code, indicate to the user what portion of the display of the display device includes the visually imperceptible matrix code, and/or provide other such alerts and/or information to the user.

By way of another example, the processing unit may divide the matrix code and add the matrix code to the interlaced video segment according to one or more predefined matrix code interlacing patterns. The processing unit may select such a matrix code interlacing pattern and/or may utilize a specific matrix code interlacing pattern. The matrix code interlacing pattern may specify a specific sequence of exactly which portions of the matrix code are added to which particular fields of which particular frames in which particular positions in reference to a selected initial frame. As such, the processing unit may divide the matrix code as specified by the matrix code interlacing pattern, select an initial frame for the sequence, and add particular portions (which may include redundantly adding one or more portions) of the matrix code to particular fields of particular frames in particular positions of the particular fields according to the matrix code interlacing pattern. The processing unit may also add a synchword (which may be any kind of indicator, such as a visual indicator, that may be identified in a detected and/or stored modified interlaced video segment by the matrix code reader device 103 as indicating an initial frame in a sequence) to the initial frame. In some instances, the synchword may identify the matrix code interlacing pattern used in the modified interlaced video segment. In other instances, the synchword may identify only the initial frame of a sequence and the matrix code interlacing pattern may be the default matrix code interlacing pattern utilized by the matrix code reader device to identify and extract portions of the matrix code from the modified interlaced video segment. The matrix code interlacing pattern may also specify a number of times to repeat the sequence in the modified interlaced video segment, which may or may not include insertion of separate synchwords to identify the initial frame of each repetition of the sequence. Based on the matrix code interlaced video segment, the matrix code reader device may be able to identify exactly where particular portions of a matrix code are located in the particular fields of particular frames of a modified interlaced video segment in time and/or position with reference to the initial frame indicated by the identified synchword. Thus, the matrix code reader device may be able to identify and extract the portions of the matrix code from the modified interlaced video segment without having to analyze each portion of each frame and determine respective positions in the matrix code of particular identified portions.

By way of a third example, the processing unit 105 may add portions of the matrix code to the interlaced video segment in such a way that the portions of the matrix code have a different display property than the video data of the interlaced video segment. For example, the portions of the matrix code may be added in such a way that the portions have a different intensity, brightness, contrast, luminosity, and so on than the video data of the interlaced video segment. As such, when the matrix code reader device 103 may analyze fields of the detected and/or stored modified interlaced video segment to identify portions that have the different display property in order to identify portions of a matrix code.

Although FIG. 1 illustrates the electronic device 101 as directly connected to the display device 102 (such as in implementations where the electronic device is a set top box and the display device is a television), other arrangements are possible without departing from the scope of the present disclosure. In various implementations, the electronic device may transmit the modified interlaced video segment to one or more intermediate electronic devices which in turn transmit the modified interlaced video segment to the display device. For example, in various implementations the electronic device may be the head end or other video processing component operated by a video programming provider (such as a satellite or cable television programming provider, a video on demand programming provider, and so on). The head end and/or other video processing component may modify interlaced video segments as described above and transmit the modified interlaced video segment to customer set top boxes. The customer set top boxes may then transmit the modified interlaced video segment received from the video programming provider to a television, computer monitor, and so on.

Figure 2:
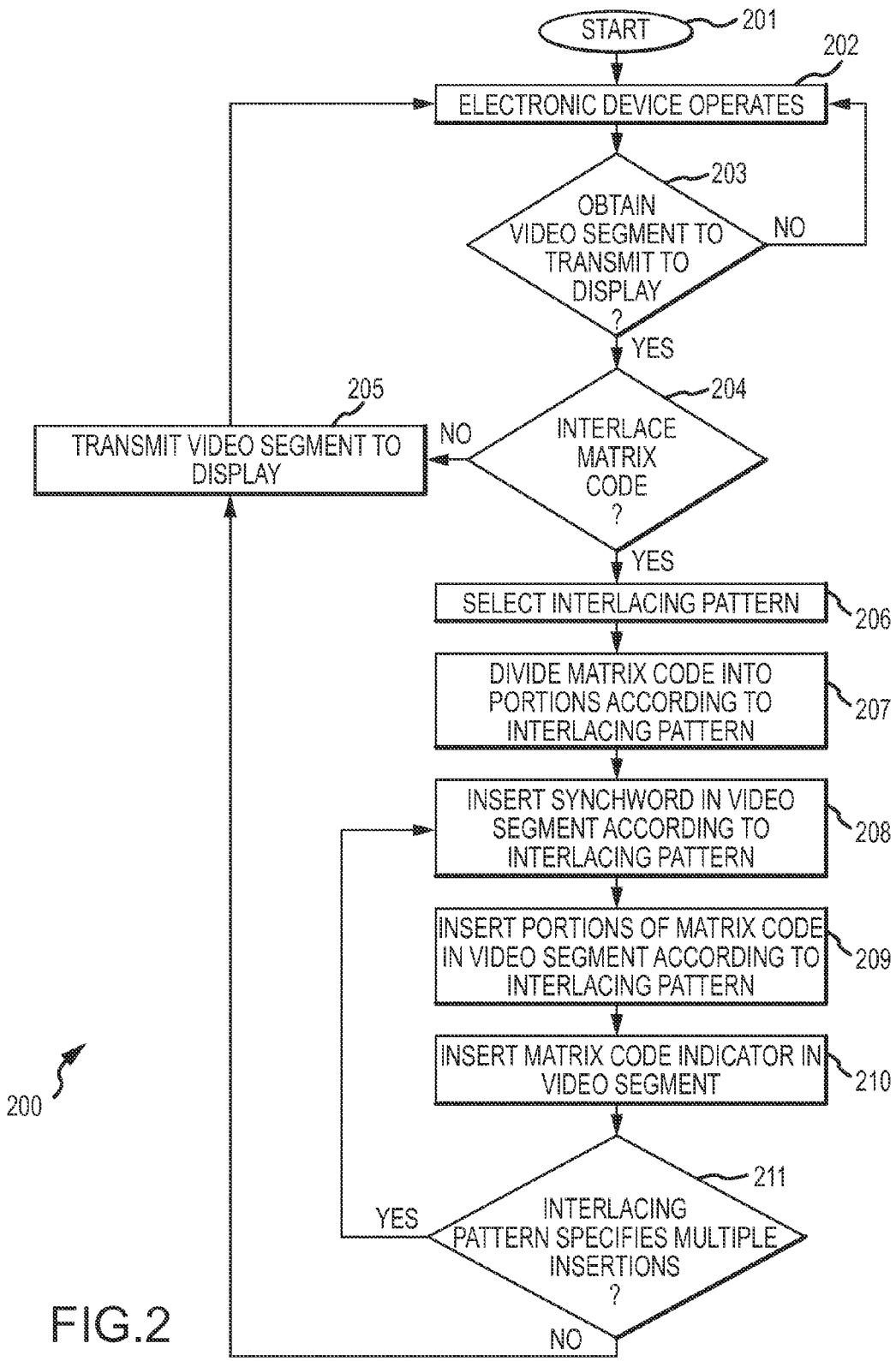
FIG. 2 is a flow chart illustrating a method for presenting matrix codes. This method may be performed by the system of FIG. 1.

FIG. 2 illustrates a method 200 for presenting matrix codes. The method 200 may be performed, for at least one embodiment, by the electronic device 101 of FIG. 1. The flow begins at block 201 and proceeds to block 202 where the electronic device operates. The flow then proceeds to block 203 where the processing unit 105 determines whether or not to obtain an interlaced video segment. For example, the processing unit may determine to obtain an interlaced video segment in response to user input specifying to transmit video to the display device 102. If so, the flow proceeds to block 204. Otherwise, the flow returns to block 202 where the electronic device continues to operate.

At block 204, after the processing unit 105 determines to obtain an interlaced video segment, the processing unit may determine whether or not to interlace a matrix code with the interlaced video segment. The processing unit may determine to interlace a matrix code with the interlaced video segment in response to receiving a matrix code to include, based on metadata included in the interlaced video segment, and so on. If not, the flow proceeds to block 205 where the processing unit transmits the interlaced video segment to the display device 102 via the output component 108 before the flow returns to block 202 where the electronic device 101 continues to operate. Otherwise, the flow proceeds to block 206.

At block 206, after the processing unit 105 determines to interlace a matrix code with the interlaced video segment, the processing unit selects an interlacing pattern to utilize in interlacing the matrix code with the interlaced video segment. In some implementations, the electronic device 101 may be configured to only use a single particular interlacing pattern. In such implementations, selecting the interlacing pattern may be retrieving information regarding the particular interlacing pattern the electronic device is configured to utilize. The flow then proceeds to block 207 where the processing unit divides the matrix code into portions according to the selected interlacing pattern. The flow then proceeds to block 208. At block 208, the processing unit inserts a synchword into the interlaced video segment according to the specifications of the selected interlacing pattern. The flow then proceeds to block 209 where the processing unit inserts the portions of the matrix code in the interlaced video segment according to the interlacing pattern with reference to the inserted synchword. Next, the flow proceeds to block 210 where the processing unit inserts a matrix code indicator to identify the presence and position of the matrix code in the interlaced video segment to a user. The flow then proceeds to block 211.

At block 211, the processing unit 105 determines whether the interlacing pattern specifies to repeat the sequence of inserted portions of the matrix code. If not, the flow proceeds to block 205 where the modified interlaced video segment is transmitted to the display device 102. Otherwise, the flow returns to block 208 where the processing unit inserts a synchword into the interlaced video segment according to the specifications of the selected interlacing pattern. However, it should be understood that in various implementations instead of returning to block 208 from block 211 when the interlacing pattern specifies to repeat the sequence of inserted portions of the matrix code, the flow may return to block 206, block 207, or other blocks in the flow without departing from the scope of the present disclosure.

Figure 3:
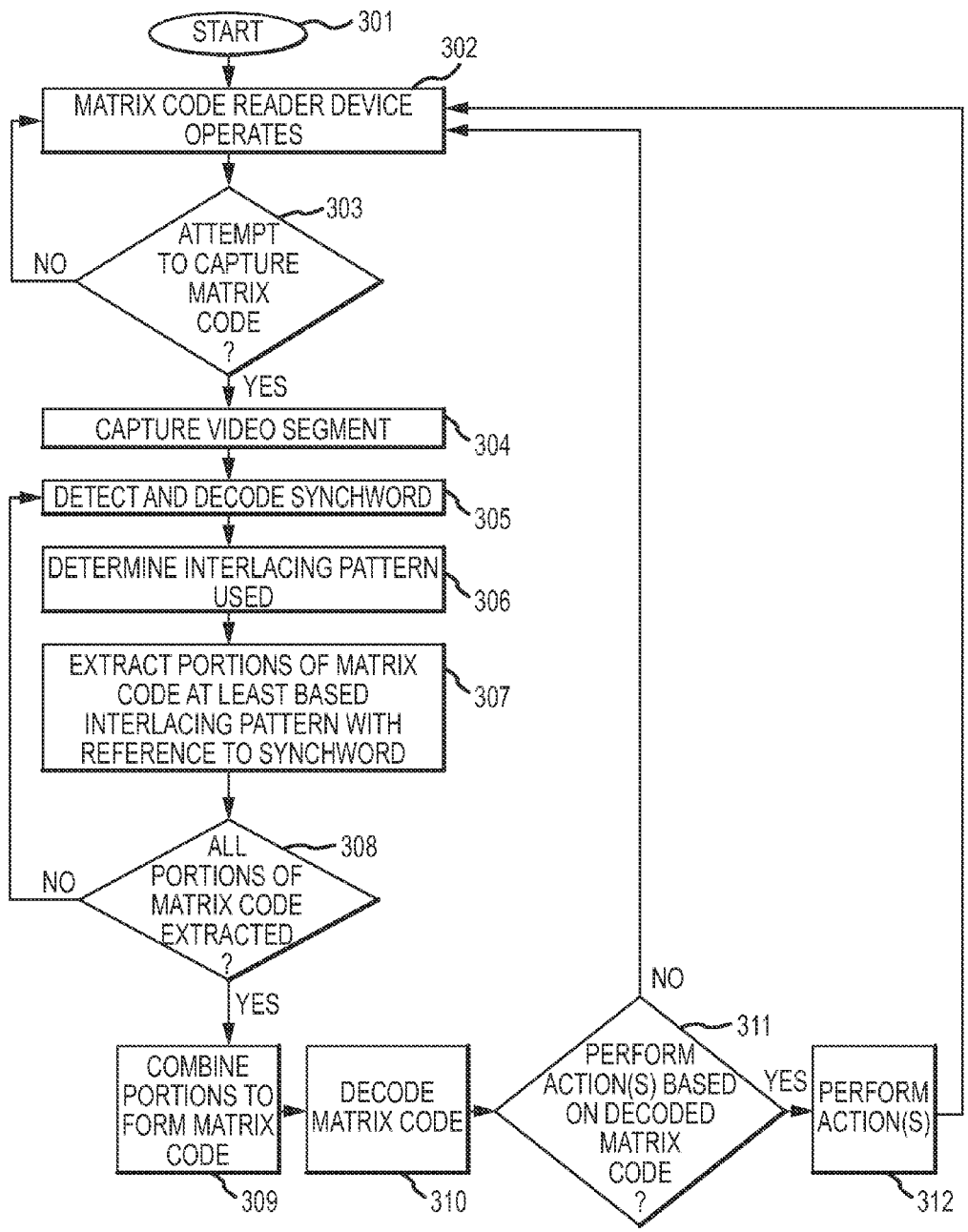
FIG. 3 is a flow chart illustrating a method for obtaining matrix codes. This method may be performed by the system of FIG. 1.

FIG. 3 illustrates a method 300 for obtaining matrix codes. The method 300 may be performed, for at least one embodiment, by the matrix code reader device 103 of FIG. 1. The flow begins at block 301 and proceeds to block 302 where the matrix code reader device operates. The flow then proceeds to block 303 where the processing unit 109 determines whether or not to attempt to capture a matrix code. The processing unit may determine to attempt to capture a matrix code based on user input received via the input/output component 112. If so, the flow proceeds to block 304. Otherwise, the flow returns to block 302 where the matrix code reader continues to operate.

At block 304, the processing unit 109 begins its attempt to capture a matrix code by utilizing the optical detector 111 to capture an image of at least a portion of a video segment displayed on the display device 102. The flow then proceeds to block 305 where the processing unit receives the image captured by the optical detector 111 and analyzes the captured image using, for example, pattern recognition software to detect and decode a synchword in the captured portion of the video segment. The flow then proceeds to block 306. At block 306, the processing unit determines from the detected and decoded synch word the interlacing pattern utilized by the captured portion of the video segment. In some implementations, the processing unit may determine the interlacing pattern utilized by the captured portion of the video segment by analyzing the identified synchword. In other implementations, the processing unit may be configured to utilize a specified interlacing pattern. As such, the processing unit may determine the interlacing pattern by retrieving information regarding the specific interlacing pattern. The specified interlacing pattern may be set for a particular electronic device 101, selected from a range of optional interlacing patterns, downloaded from time to time, or otherwise updated, modified and/or selected using commonly available system configuration update processes. The flow then proceeds to block 307 where the processing unit extracts portions of the matrix code at least based on the determined interlacing pattern with reference to the synchword. The flow then proceeds to block 308.

At block 308, the processing unit 109 determines whether all portions of the matrix code have successfully been extracted. In some implementations, the processing unit may determine whether all portions of the matrix code have been successfully extracted by analyzing the interlacing pattern to determine if portions were expected that were not extracted. In other implementations, the processing unit may match the portions extracted against their respective positions in the matrix code to determine if there are any positions in the matrix code which do not have matching extracted portions. If all portions of the matrix code have been extracted, the flow proceeds to block 309. Otherwise, the flow returns to block 305 where the processing unit detects a synchword in the captured portion of the video segment. However, in other implementations, instead of the flow returning from block 308 to block 305 if all portions of the matrix code have not been extracted, the flow may return to block 304, 306, 307, or other blocks in the flow without departing from the scope of the present disclosure.

At block 309, after the processing unit 109 determines that all portions of the matrix code have been extracted, the processing unit combines the extracted portions to form the matrix code. The flow then proceeds to block 310 where the processing unit decodes the matrix code.

The flow then proceeds to block 311 where the processing unit 109 determines whether or not to perform one or more actions based on the decoded matrix code. The processing unit may determine to perform one or more actions based on the decoded matrix code according to information decoded from the matrix code, user preferences stored in the non-transitory storage medium 110, and so on. If not, the flow returns to block 302 where the matrix code reader 103 continues to operate. Otherwise, the flow proceeds to block 312 where the processing unit performs the one or more actions. The flow then returns to block 302 where the matrix code reader continues to operate.

Figure 4A:
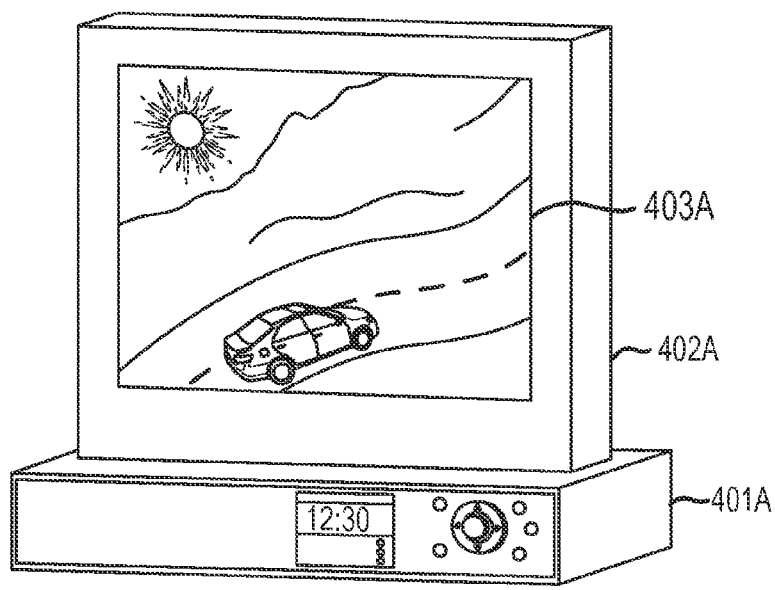
FIGS. 4A-4I are diagrams illustrating a user utilizing a system for conveying matrix codes. The system may be the system of FIG. 1.
Figure 4A:
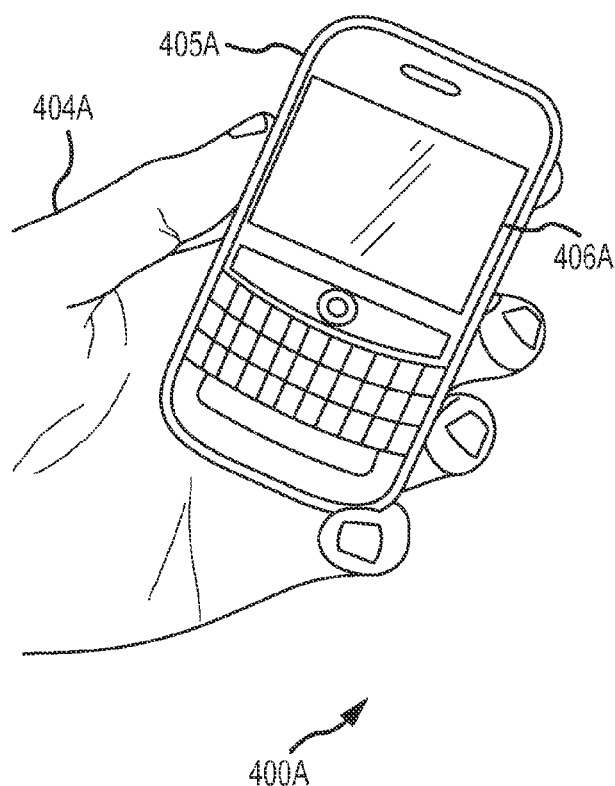

FIGS. 4A-4I illustrate a user 404A-404I utilizing a system 400A-400I for conveying matrix codes. The system 400A-400I may be the system of FIG. 1. In FIG. 4A, a user 404A with a smart phone 405A is watching a PAL based television 402A which is displaying video programming provided by a set top box 401A on a screen 403A. As depicted, a commercial for an automobile is depicted on the screen.

The video segment for the commercial provided by the set top box 401A to the television 402A is an interlaced video segment that comprises multiple frames, each frame including two fields. The first field contains the odd lines for the respective frame and the second line contains the even. The television displays fifty fields per second for a frame rate of twenty-five frames per second. Additionally, the set top box interlaced a QR code into the interlaced video segment according to an interlacing pattern. As specified by the interlacing pattern, the set top box divided the QR code into a number of portions and included the portions in fields of the interlaced video segment in sequences that repeat continuously throughout the automobile commercial after the visual appearance of a QR code indicator 407B (as seen in FIG. 4B), which the set top box also inserted in the interlaced video segment.

Figure 4B:
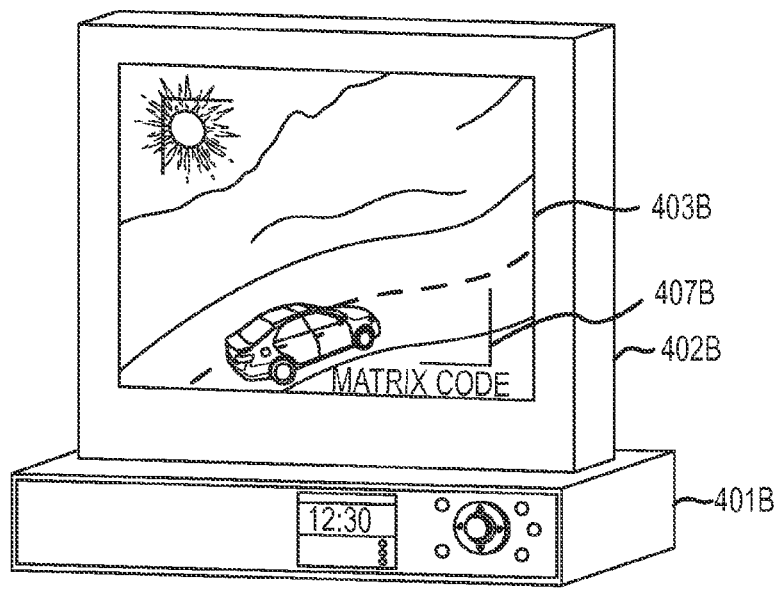
Figure 4B:
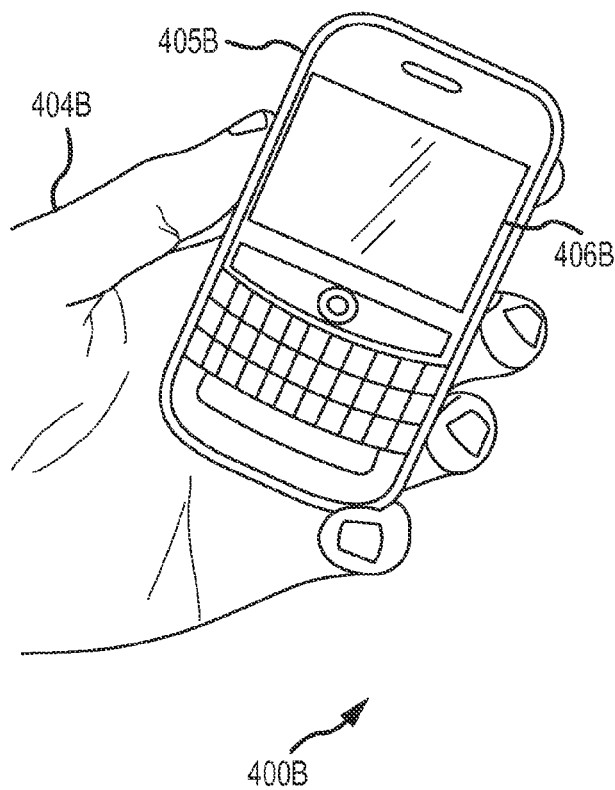

As illustrated in FIG. 4B, the QR code indicator includes triangular elements that indicate the boundaries of the QR code, or the portion of the screen 403B which the user may need to capture in order to capture the QR code, along with a text message indicating that a QR code is present. The user 404B may utilize the smart phone 405B to capture a portion of the video that is displayed on the screen as indicated to that user by the QR code indicator.

Figure 4C:
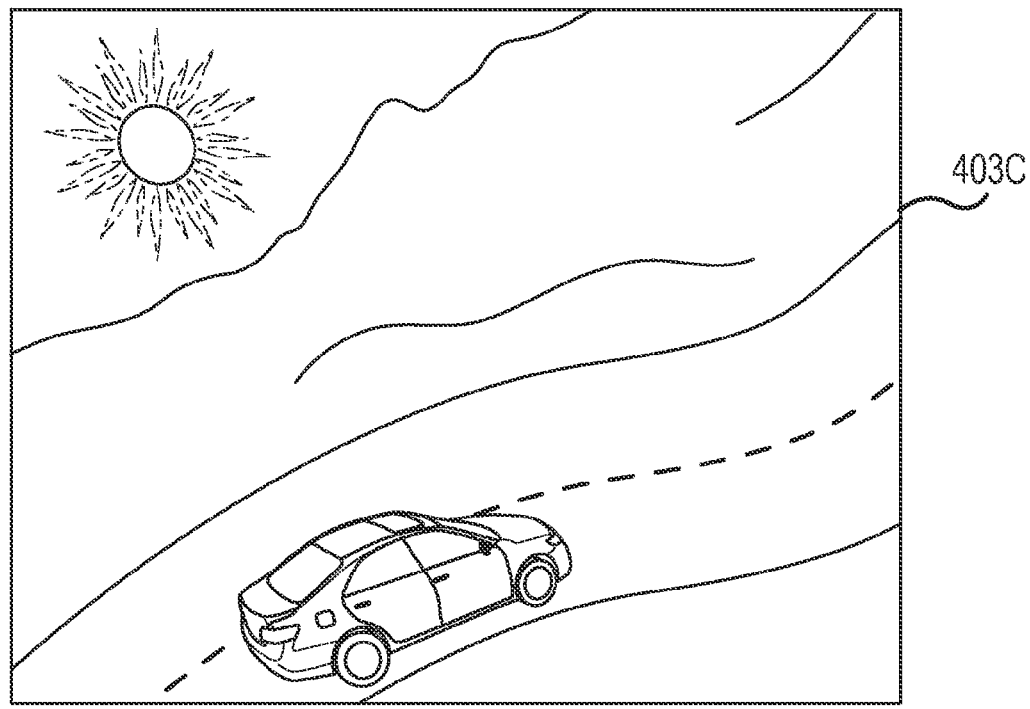
Figure 4D:
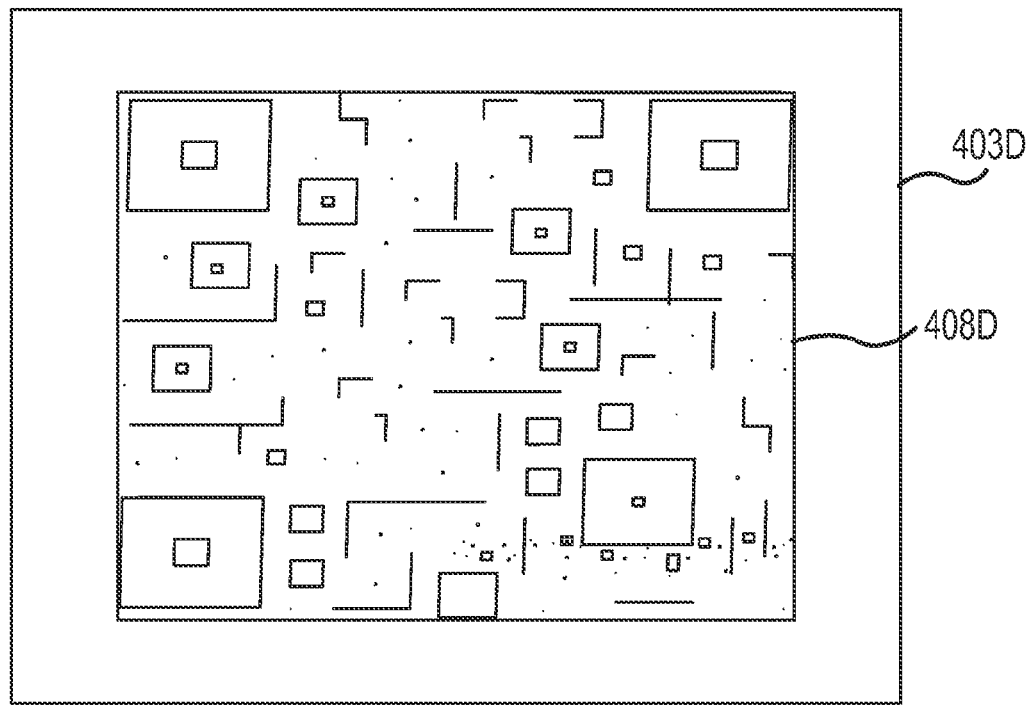
Figure 4E:
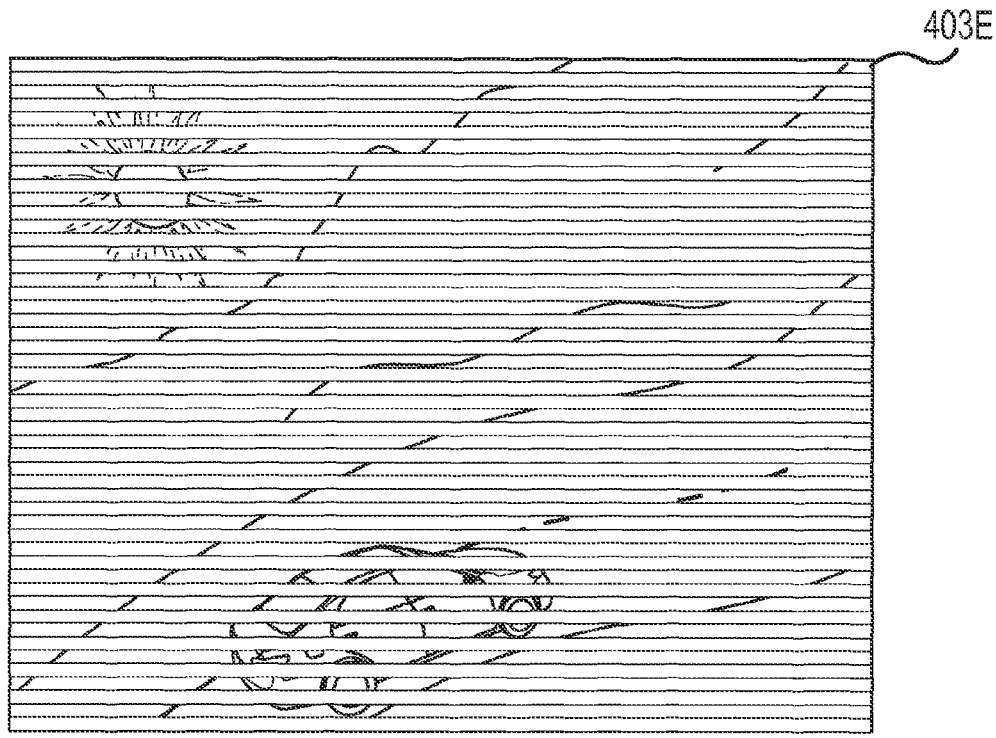
Figure 4F:
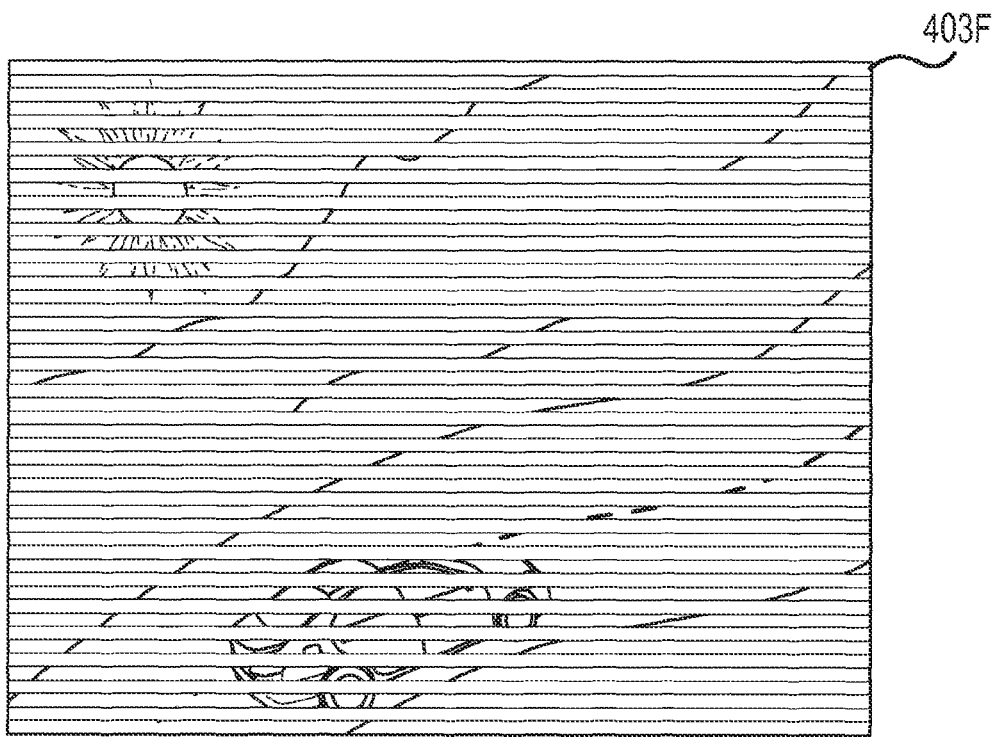

FIG. 4C depicts a close up of the screen 403C which is displaying a frame of the video segment of the automobile commercial. FIG. 4D depicts what the QR code 408D that is interlaced into the video segment would look like if the QR code were displayed on the screen 403D all at one time. As can be seen, the QR code would disrupt viewing of the automobile commercial if shown all at one time such that the QR code was visually perceptible. FIG. 4E illustrates the odd lines of the frame illustrated in FIG. 4C that are contained in a first field. FIG. 4F illustrates the even lines of the frame illustrated in FIG. 4C that are contained in a second field.

Figure 4G:
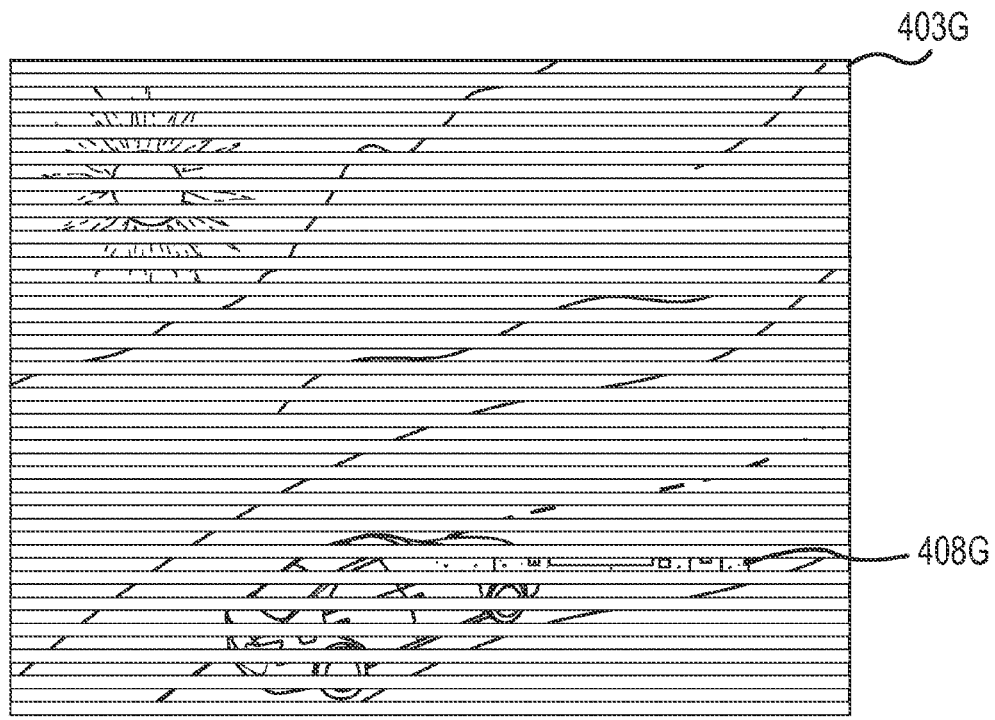

FIG. 4G illustrates the first field of the frame illustrated in FIG. 4C after a portion of the QR code 408G is added. The second field would still look like FIG. 4F as a portion of the matrix code is not added to the second field.

Figure 4H:
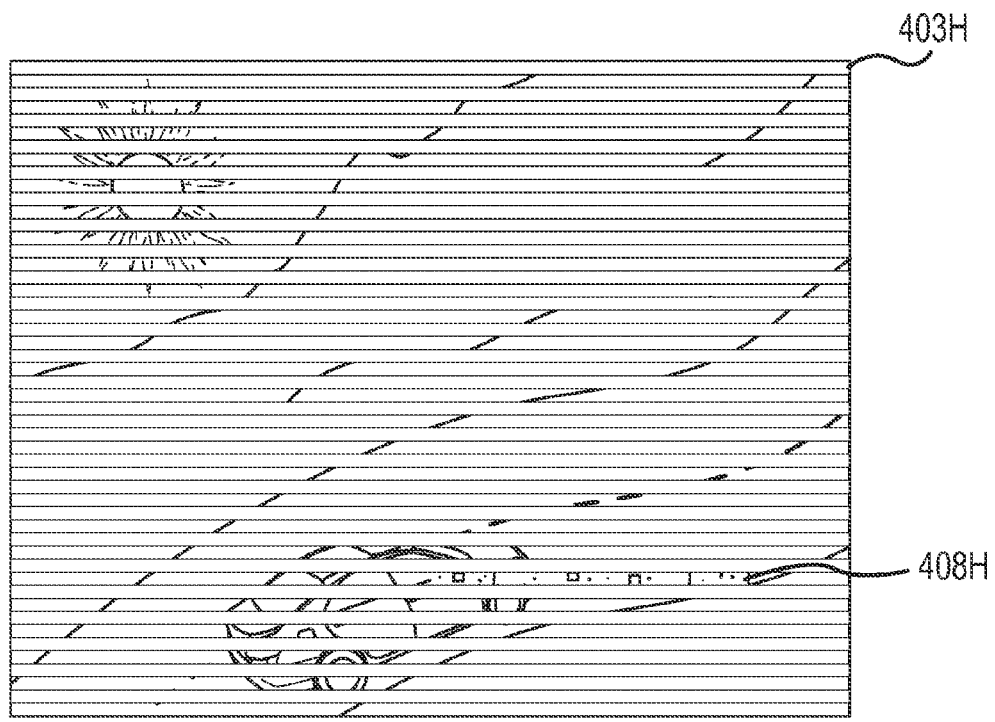
Figure 4I:
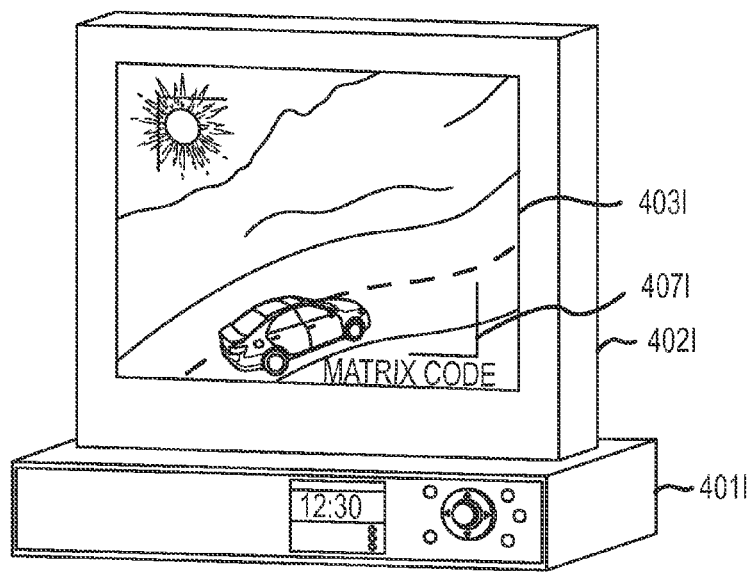
Figure 4I:
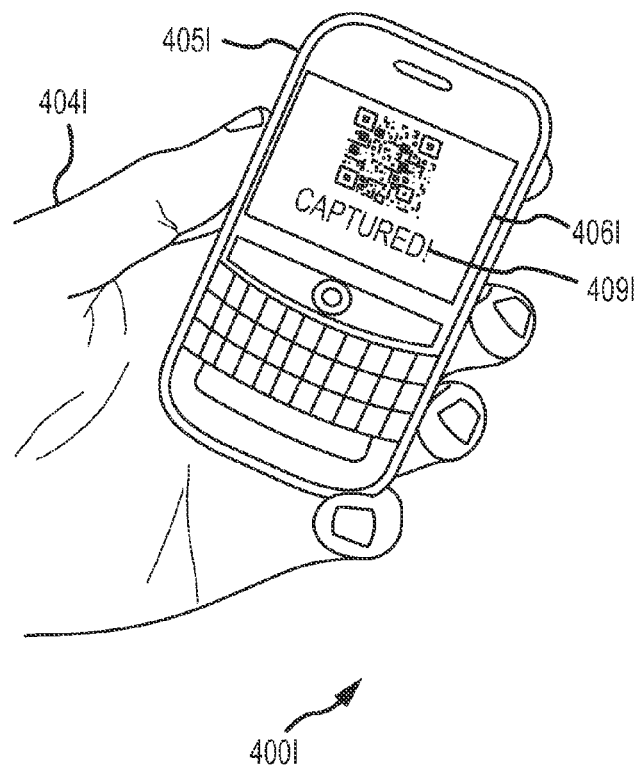

However, a frame immediately subsequent to the frame illustrated in FIG. 4C which still shows the same video data as the frame illustrated in FIG. 4C does not include a portion of the QR code in the first field and would resemble FIG. 4E. Further, the frame immediately subsequent to the frame illustrated in FIG. 4C does include a portion of the QR code 408H, as illustrated in FIG. 4H.

As illustrated, the user 404I may utilize the smart phone 405I to capture a portion of the video that is displayed on the screen as indicated to that user by the QR code indicator 407I. The smart phone may then analyze the captured portion of the video to identify and extract the portions of the QR code included in the captured portion of the video, combine the portions to form the QR code, decode the QR code, and present a message 409I on a screen 406I of the smart phone indicating that the QR code has been captured.

Thus, the user 404 is unlikely to miss capturing and utilizing the QR code 408 due to the QR code being shown for too short a period of time as the QR code is displayed throughout the automobile commercial. However, because the QR code is interlaced with the video data of the automobile commercial, the user does not have their vision of the automobile commercial obscured by the QR code. The user can capture the QR code at his leisure at any time during the automobile commercial and still be able to view the automobile commercial uninterrupted.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for presenting matrix codes, the method comprising:
obtaining an interlaced video segment, utilizing at least one processing unit, comprising a sequence of frames of video data that each include at least a first field and a second field wherein the first field for each respective frame includes a first portion of information to display for the respective frame and the second field for each respective frame includes a second portion of the information to display for the respective frame;
generating a modified interlaced video segment, utilizing the at least one processing unit, by combining at least one matrix code with the interlaced video signal such that:
at least a first portion of the at least one matrix code is included in the first field of a first frame of the sequence of frames and not in the second field of the first frame, and
at least a second portion of the at least one matrix code is included in the second field of a second frame of the sequence of frames and not in the first field of the second frame,
wherein all of the at least one matrix code is included in at least a portion of the modified interlaced video segment; and
transmitting the modified interlaced video segment to at least one display device utilizing the at least one processing unit wherein the at least one matrix code can be captured utilizing at least one matrix code reader device by detecting the at least a portion of the modified interlaced video segment that includes the at least one matrix code when displayed by the at least one display device and extracting the at least one matrix code from the at least a portion of the modified interlaced video segment and wherein the at least one matrix code is visually imperceptible by a user viewing the at least a portion of the modified interlaced video segment when displayed by the at least one display device.

2. The method of claim 1, wherein the second frame is immediately subsequent to the first frame in the sequence of frames.

3. The method of claim 1, wherein said operation of generating a modified interlaced video segment, utilizing the at least one processing unit, by combining the at least one matrix code with the interlaced video signal further comprises:
adding an indicator to the modified interlaced video segment that indicates at least one of presence of the at least one matrix code in the modified interlaced video segment, at least one reference point corresponding to the at least one matrix code, or at least one boundary of the at least one matrix code in the modified interlaced video segment.

4. The method of claim 1, wherein the first portion of the at least one matrix code is included in at least two frames of the at least a portion of the modified interlaced video segment.

5. The method of claim 1, wherein the first portion of the at least one matrix code includes a display property that is different from that of the video data.

6. The method of claim 1, wherein said operation of generating a modified interlaced video segment, utilizing the at least one processing unit, by combining the at least one matrix code with the interlaced video signal further comprises:
including specific portions of the at least one matrix code in specific positions in specific first fields and second fields of specific frames of the sequence of frames in relation to an initial frame of the sequence of frames according to a predefined matrix code interlacing pattern.

7. The method of claim 6, wherein adding a synchword to the initial frame that identifies a start of the predefined matrix code interlacing pattern.

8. The method of claim 1, wherein all of the at least one matrix code is also included in at least one additional portion of the modified interlaced video segment.

9. The method of claim 1, wherein said operation of extracting, utilizing the at least one matrix code reader device, at least the first portion of the at least one matrix code and the second portion of the at least one matrix code from the detected at least a portion of the interlaced video segment further comprises at least one of:
identifying an indictor in the detected at least a portion of the interlaced video segment that indicates at least one of presence of the at least one matrix code in the interlaced video segment, at least one reference point corresponding to the at least one matrix code, or at least one boundary of the at least one matrix code in the interlaced video segment;

identifying a display property of an element of a frame that is different from that of the video data in the frame;

identifying a synchword included in an initial frame that identifies a start of a predefined matrix code interlacing pattern that was utilized to include specific portions of the at least one matrix code in specific positions in specific first fields and second fields of specific frames of the sequence of frames.

10. A method for obtaining matrix codes, the method comprising:

detecting, utilizing at least one matrix code reader device, at least a portion of an interlaced video segment displayed on a display device that includes at least one matrix code wherein:

the interlaced video segment comprises a sequence of frames of video data that each include at least a first field and a second field wherein the first field for each respective frame includes a first portion of information to display for the respective frame and the second field for each respective frame includes a second portion of the information to display for the respective frame, and the first field of a first frame of the sequence of frames but not the second field of the first frame includes at least a first portion of the at least one matrix code and the second field of a second frame of the sequence of frames but not the first field of the second frame includes at least a second portion of the at least one matrix code;

extracting, utilizing the at least one matrix code reader device, at least the first portion of the at least one matrix code and the second portion of the at least one matrix code from the detected at least a portion of the interlaced video segment; and combining at least the first portion of the at least one matrix code and the second portion of the at least one matrix code to form the at least one matrix code utilizing the at least one matrix code reader device.

11. A system for conveying matrix codes, comprising:

an electronic device comprising:

an obtaining component that obtains an interlaced video signal that comprises a sequence of frames of video data that each include at least a first field and a second field wherein the first field for each respective frame includes a first portion of information to display for the respective frame and the second field for each respective frame includes a second portion of the information to display for the respective frame;

at least one processing unit that generates a modified interlaced video segment by combining at least one matrix code with the interlaced video signal such that at least a first portion of the at least one matrix code is included in the first field of a first frame of the sequence of frames but not in the second field of the first frame, at least a second portion of the at least one matrix code is included in the second field of a second frame of the sequence of frames but not in the first field of the second frame, and all of the at least one matrix code is included in at least a portion of the modified interlaced video segment; and at least one output component that transmits the modified interlaced video segment to at least one display device; and at least one matrix code reader device comprising:

at least one optical detector that detects the at least a portion of the modified interlaced video segment displayed by the at least one display device; and at least one matrix code reader device processing unit that extracts at least the first portion and the at least the second portion of the at least one matrix code from the detected at least a portion of the modified interlaced video segment and combines the at least the first portion and the second portion to form the at least one matrix code;

wherein the at least one matrix code is visually imperceptible by a user viewing the at least a portion of the modified interlaced video segment when displayed by the at least one display device.

12. The system of claim 11, wherein the at least one matrix code reader device processing unit performs at least one of decoding the formed at least one matrix code or transmitting the formed at least one matrix code to a decoder device utilizing at least one output device.

13. The system of claim 11, wherein the at least one processing unit includes specific portions of the at least one matrix code in specific positions in specific first fields and second fields of specific frames of the sequence of frames in relation to an initial frame of the sequence of frames according to a predefined matrix code interlacing pattern and adds a synchword to the initial frame that identifies a start of the predefined matrix code interlacing pattern.

14. The system of claim 13, wherein the at least one matrix code reader device processing unit identifies the synchword and extracts the at least the first portion and the at least the second portion of the at least one matrix code from the detected at least a portion of the modified interlaced video segment based on their relation to the initial frame according to the predefined matrix code interlacing pattern.

15. The system of claim 13, wherein predefined matrix code interlacing pattern specifies to include a redundant version of the first portion of the at least one matrix code in at least one of the first field of at least a third frame of the sequence of frames or the second field of the at least a third frame.

16. The system of claim 11, wherein the at least one matrix code is included multiple times in the modified interlaced video segment.

17. The system of claim 11, wherein the at least one optical detector comprises at least one of a still image camera or a video camera.

18. The system of claim 11, wherein the first portion of the at least one matrix code includes a display property that is different from that of the video data and the at least one matrix code reader device processing unit identifies the display property and utilizes the identified display property in extracting the at least the first portion and the at least the second portion of the at least one matrix code from the detected at least a portion of the modified interlaced video segment.

19. The system of claim 11, wherein the at least one processing unit adds an indicator to the modified interlaced video segment that indicates at least one of presence of the at least one matrix code in the modified interlaced video segment, at least one reference point corresponding to the at least one matrix code, or at least one boundary of the at least one matrix code in the modified interlaced video segment.

20. The system of claim 19, wherein the at least one matrix code reader device processing unit identifies the indicator and utilizes the identified indicator in extracting the at least the first portion and the at least the second portion of the at least one matrix code from the detected at least a portion of the modified interlaced video segment.

21. A video signal produced by a process comprising the operations of:
- obtaining an interlaced video segment that comprises a sequence of frames of video data that each include at least a first field and a second field wherein the first field for each respective frame includes a first portion of information to display for the respective frame and the second field for each respective frame includes a second portion of the information to display for the respective frame;
- generating a modified interlaced video segment by combining at least one matrix code with the interlaced video signal such that:
    - at least a first portion of the at least one matrix code is included in the first field of a first frame of the sequence of frames and not in the second field of the first frame, and
    - at least a second portion of the at least one matrix code is included in the second field of a second frame of the sequence of frames and not in the first field of the second frame,
    - wherein all of the at least one matrix code is included in at least a portion of the modified interlaced video segment; and wherein when the modified interlaced video segment is displayed by at least one display device the at least one matrix code can be captured utilizing at least one matrix code reader device by:
- detecting the at least a portion of the modified interlaced video segment that includes the at least one matrix code, and
- extracting the at least one matrix code from the at least a portion of the modified interlaced video segment; and wherein the at least one matrix code is visually imperceptible by a user viewing the at least a portion of the modified interlaced video segment when displayed by the at least one display device.

* * * * *